United States Patent [19]

Reid

[11] Patent Number: 4,702,060
[45] Date of Patent: Oct. 27, 1987

[54] ADJUSTABLE PACKAGING DEVICE

[75] Inventor: Laurie M. Reid, Longwood, Fla.

[73] Assignee: Uni-Pak Film Systems, Inc., Roswell, Ga.

[21] Appl. No.: 878,998

[22] Filed: Jun. 26, 1986

[51] Int. Cl.⁴ ............................................. B65B 51/18
[52] U.S. Cl. .......................................... 53/69; 53/504; 53/379; 53/556; 156/583.5
[58] Field of Search ................. 53/379, 556, 441, 463, 53/55, 52, 504, 69, 67, 76; 156/583.5, 583.91

[56] References Cited

U.S. PATENT DOCUMENTS

| | | | |
|---|---|---|---|
| 3,157,975 | 11/1964 | Altman, Jr. | 53/379 |
| 3,727,365 | 4/1973 | Stohlquist | 53/463 X |
| 3,807,117 | 4/1974 | Abrams | 53/556 X |
| 3,890,763 | 6/1975 | Ullman | 53/329 |
| 4,036,362 | 7/1977 | Ullman | 206/432 |
| 4,365,456 | 12/1982 | Ullman | 53/379 X |
| 4,454,704 | 6/1984 | Ullman | 53/379 X |
| 4,475,653 | 10/1984 | Ullman | 53/379 X |

Primary Examiner—James F. Coan
Attorney, Agent, or Firm—Jones, Askew & Lunsford

[57] ABSTRACT

A packaging machine for bonding a sheet to opposite walls and over the articles therein. One embodiment has a conveyor which moves the trays down a predetermined path, during which a film sheet is disposed over the tops of the articles in each of the trays, and flight bars traveling about an orbital path interpose the sheet between the trailing and leading walls of each of the successive trays and press the sheet against the adjacent trailing and leading walls. Heating elements associated with each of the flight bars heat the sheet, while compressed, to form a bond between the film sheet and the tray walls. The heating elements are controlled by an improved electrical circuit. Three independently movable sets of flight bars are provided for placing each of the trays in compression whereby the apparatus is adjustable as required to accommodate trays of different sizes over a range within the limits of the machine. Improved cutting means separate the sheet between adjacent trays after the bonding process, and the trays then proceed to a heating tunnel if heat shrinking of the film is desired.

22 Claims, 17 Drawing Figures

Fig_1

Fig_2

ADJUSTABLE PACKAGING DEVICE

TECHNICAL FIELD

This invention relates to packaging devices, and in particular relates to machines for packing articles such as cans, bottles, and the like in each of a series of trays. The invention relates particularly to packaging machines that are operative, in sequence, to draw a film sheet from a roll of the film over the articles in a tray, to cause the sheet to adhere to at least one pair of opposite tray walls, and to hold the articles in the tray.

BACKGROUND ART

General Prior Art Packing Devices

In packaging bottles, cans and other such containers, it has been known to assemble the containers into cardboard trays and to provide a transparent film around the trays and containers, which allows for identification of the containers while packaged. However, this packaging configuration is disadvantageous in that it necessitates the use of film on the bottom of the trays, which is not only wasteful, but also creates problems if further processing of the trays includes frictional sliding contact on the bottom of the trays.

Therefore, it has been known to provide packaging machines which apply a sheet of film over the top of the containers, and weld the film to side walls of the trays. Such a packaging machine is disclosed in U.S. Pat. No. 3,890,763 issued on June 24, 1975, to Ullman, and incorporated herein by reference. The packaging machine there illustrated and described, a high speed WRAPCAP machine, includes a conveyor for moving a series of rectangular corrugated paperboard trays along a predetermined path. Arranged in succession along the path are a first glue station, a turning station, a film disposing station, and a compression station. At the first glue station glue applicators are provided on opposite sides of the path for applying a stripe of adhesive on the outside walls of each tray. The turning station rotates the tray through a right angle so that the trays then advance with the adhesive stripe on the leading and trailing walls. Additional glue is then provided on the other opposite walls of each tray. At the film supplying station a supply of film, for examplel of polyvinyl chloride, polypropylene or polyethylene, is provided. As the tray moves through the film disposing station, the film sheet material is drawn over the top of the tray by a plurality of flight bars commonly driven along an orbital path. The flight bars press the film against the adhesive stripes on the trays, and the adhesive then bonds the film to the tray. Cutting blades are provided in cooperative relation with the the flight bars for piercing and separating the film sheet material between trays. After the sheet has been cut, the tray is then released and discharged from the compression station. The tray then moves on a downwardly inclined conveyor to be conveyed to a heat shrink tunnel. In the shrink tunnel, the heat shrinking of the sheet brings its unbonded side portios into contact with the second pair of adhesive stripes to form a bond. Additionally, spring-loaded rollers are provided at opposite sides of the shrink tunnel exit to flatten out rough ears of the sheet and to press the side portions of the sheet against the adhesive to form a better and more attractive bond.

Although machines as described above are effective, they possess a number of disadvantages, one being that the machines are limited to processing a fixed package size, as the flight bars are all fixed to one pair of drive chains.

U.S. Pat. No. 4,365,456, issued on Dec. 28, 1986, to Ullman, and herein incorporated by reference, discloses an adjustable WRAPCAP packaging apparatus including two independently movable sets of flight bars, which allow the apparatus to be adjusted to accommodate packages of different sizes over a range within the limits of the machine. The method of adhering plastic film disclosed in the '456 patent includes placing the film over the tops of the packages, pressing the film sheet against the front and rear walls of the package, and while so compressed heating the film for a sufficient length of time to weld the film sheet to the walls of the package, and then releasing the heat and pressure.

Although the adjustable WRAPCAP machine is effective in accepting a plurality of tray sizes, its capacity is limited in that it may only maintain one package in compression at one time, unlike the high speed WRAPCAP device previously discussed.

Prior Art Cutting Devices

As previously discussed, the prior art packaging devices disclosed in the patents to Ullman include cutting assemblies associated with the flight bars which cut the film between the packages after the film has been welded to the packages. These cutting assemblies are mounted to each flight bar and include a pair of knife assemblies slidably mounted along a horizontal axis to a common horizontal bar, which is likewise slidably mounted along a vertical axis by a pair of shoulder bolts rigidly extending upwardly from the flight bar. During operation of the cutting assemblies, rollers mounted to butt ends of the horizontal bar encounter a pair of cooperating cam tracks, which force the rollers, the horizontal bar, and the knife assemblies downwardly, such that the knives pierce the film sheet. Thereafter, a second pair of rollers attached to the knife assemblies encounter a second pair of cam tracks, forcing the knife assemblies outwardly along the horizontal bar, thus severing the film sheet.

This configuration is disadvantageous in that the cams and cams followers must be critically aligned such that the horizontal bar does not bind on the shoulder bolts during the downward cutting stroke. Furthermore, this configuration is disadvantageous in that it tends to be complex and heavy.

Prior Art Welding Configurations

In prior art machines, welding of the film to the trays was done by electrically energized heating strips provided on each side of the flight bars. However, prior art heating strips were required to be independently controlled to compensate for differences in the heating characteristics of each individual welding strip. An example of such independent control is shown in the device disclosed in U.S. Pat. No. 4,454,704 to Ullman. This device includes complex control circuitry which allows the machine to independently control the operation of each of the heating elements to assure uniform constant temperature is applied to the film and to prevent "burn-through" of the film, which occurs when film temperature is excessive. Prior heating strips also were separated from the film by intermediate metallic strips which evenly distributed the heat from the heating strips, but also acted as heat sinks, which required warm-up and cool-down periods, further complicating control of the heating elements.

Therefore, it may be seen that a need has existed for a packaging machine which allows for more than one package to be under compression at a time, thereby increasing the capacity of the machine, but is also adjustable to accommodate a variety of tray sizes. A need has also existed for a means of controlling the heating elements which is less complex and expensive than prior art devices. Finallyl, need has also existed for a cutting device which is lightweight and simple in design and operation.

SUMMARY OF THE INVENTION

The present invention overcomes problems in the prior art by providing a packaging machine which compresses two packages at a time, thereby increasing the capacity of the machine, and is adjustable to accommodate a range of tray sizes. The present invention also provides a means of controlling the heating elements which is less complex and expensive than prior art devices. The present invention also provides an improved cutting device which requires less cams and cam followers than prior art machines.

Generally described, the packaging device of the present invention comprises means for guiding a plurality of said containers along a path of travel; means for disposing a sheet over a plurality of the trays; a first flight bar; transport means for moving the first flight bar in an orbital path, the orbital path including a path segment extending along the path of travel of the containers; a second flight bar; second transport means for moving the second flight bar in the orbital path; a third flight bar; and third transport means for moving the third flight bar in the orbital path; the first, second and third transport means operating independently of one another; such that during the path segment the film sheet is pressed by one of the flight bars against the leading wall of said containers, by another of the flight bars against the trailing wall of the one container and against the trailing wall of the other container by the remaining flight bar.

Stated somewhat more particularly, the packaging device of the present invention further comprises electrical heater strips mounted along both sides of each of the flight bars such that the heater strips engage the film sheet when the flight bars press the film sheet against the walls of the containers; and means for applying the same heating voltage to all of the heating strips.

Generally described, the packaging device of the present invention alternatively comprises means for moving a plurality of flight bars to dispose a continuous sheet of film over the trays and bond the film to the trays; at least one film cutting means slidably mounted to each of the flight bars for horizontal and vertical movement with respect to the flight bars; a cam follower operably associated with each of the cutting means; means for defining a cam surface in the path of each of the cam followers; and each of the cam followers travelling along the cam surface so as to cause the cutting means to move vertically to pierce the film, and thereafter to move horizontally to sever a portion of the film.

Thusl, it is an object of the present invention to provide an improved packaging device.

It is a further object of the present invention to provide an adjustable film packaging device which has an increased capacity.

It is a further object of the present invention to provide an improved method of and apparatus for forming a tight package comprising a paperboard tray and a covering film sheet.

It is a further object of the present invention to provide a package which does not have a film-like material on the bottom of the tray to interfere with the sliding of the package, and which is more economical in that it uses less film than conventional film packages.

It is a further object of the present invention to provide such a packaging device which does not burn through the film.

It is a further object of the present invention to provide an improved film cutting device for a packaging apparatus.

It is a further object of the present invention to provide a film cutting device which requires a reduced number of cams and cam followers.

It is a further object of the present invention to provide a film cutting device which is simple to operate and maintain.

It is a further object of the present invention to provide improved control circuitry for heating strips of a film packaging apparatus.

Other objects, features, and advantages of the present invention will become apparent upon reading the following detailed description of the preferred embodiment of the invention, when taken in conjunction with the drawing and the appended claims.

DETAILED DESCRIPTION OF THE INVENTION

Figure 1:
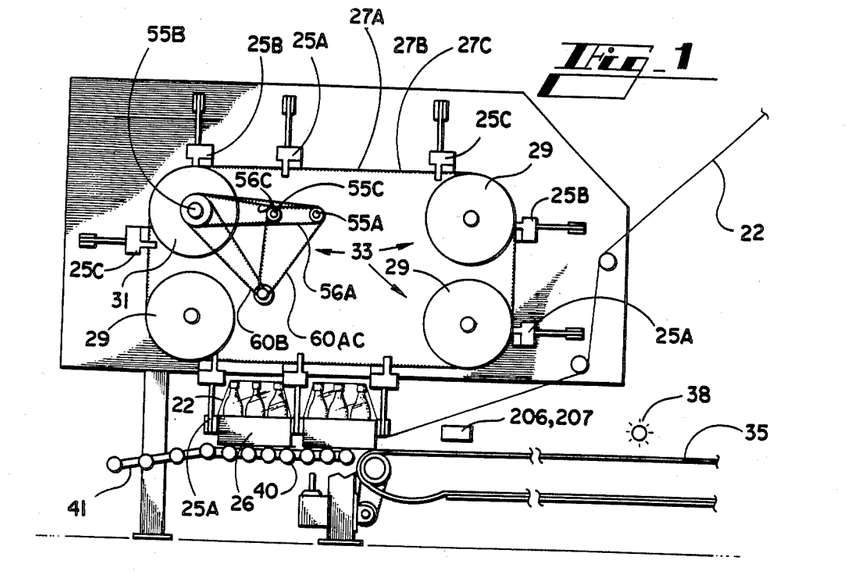
FIG. 1 is a side cutaway plan view of the packaging machine of the present invention.

Referring now to FIG. 1, a packaging apparatus 20 embodying the present invention is shown. The packaging apparatus 20 cooperates with an upstream indexing stationn (not shown), a film supply station (not shown) which supplies a continuous sheet of heat shrinkable film 22, and a downstream heat shrink station (not shown). The stations not shown are similar to thosE shown in U.S. Pat. No. 4,365,456 which is expressly incorporated herein by reference in its entirety. The packaging machine 20 includes sets of flight bars 25A, 25B, 25C, flight bar chains 27A, 27B, 27C, a drive train assembly 33, and infeed conveyor 35, microswitches 206, 207, a limited slip conveyor 40, and an exit conveyor 41.

As will be discussed in further detail later in this application, the flight bars 25A, 25B, 25C are independently driven along a common orbital path by the flight bar chains 27A, 27B, 27C, respectively. As the packaging apparatus 20 accepts the heat shrinkable film 35 from the film supply station, the flight bars 25A, 25B, 25C, combine to dispose and stretch the film over the tops of loaded trays or packages 26, press the film against the front and rear walls of the trays, and heat-weld the film to the front and rear walls of the trays. After the bond is made between the film 22 and the trays, cutting assemblies, as shown in FIG. 4, in each of the flight bars pierce and separate the film between adjacent trays. The flight bars then continue along their path to eject the covered trays to the rear of the packaging apparatus 20. The trays are then subjected to an overall heating process, which shrinks the film covering in a known manner to provide a compact, readily transportable loaded tray.

As will be discussed further in this application, the independently driven flight bars have various corresponding drive and control means, i.e. clutches, chains, brakes, etc. Therefore, for purposes of explanation, these various related elements have been assigned a corresponding suffix A, B, or C. For example, the chains which drive flight bars 25A have been denoted as flight bar chains 27A and the chains which drive flight bars 25B have been denoted as flight bar chains 27B. Furthermore, for purposes of explanation, the right side of the machine is that side on the right as viewed from the infeed end of the machine.

In the preferred embodiment of the present invention, three flight bars are attached to each set of chains, although more or fewer flight bars may be used without departing from the spirit and scope of the present invention. Thus, for example, reference to a flight bar 25A refers to any of three flight bars on the chain 27A. Therefore it may be seen that a total of nine flight bars are present in the preferred embodiment of the present invention.

Drive Train Assemblies

Figure 2:
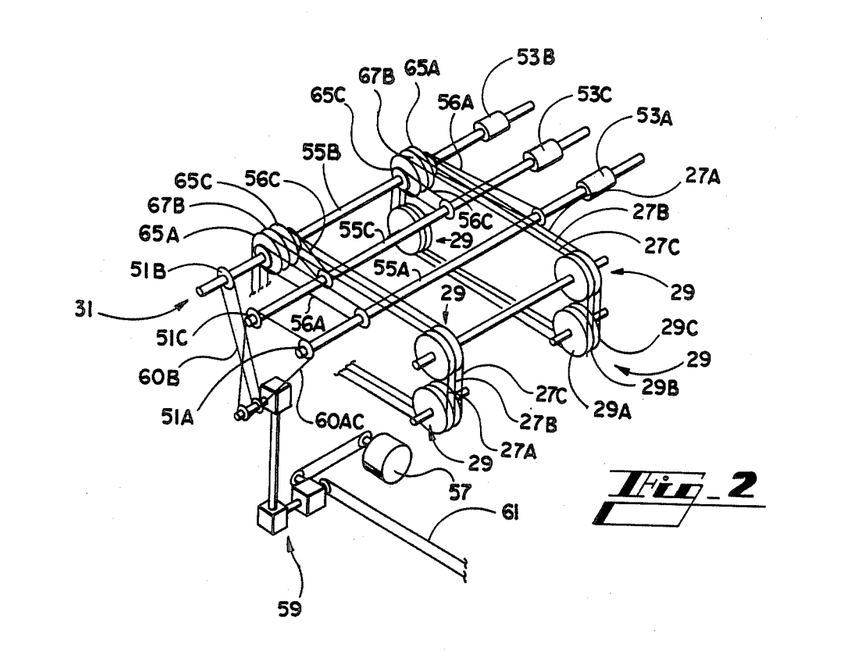
FIG. 2 is an isolated pictorial view of the drive train assembly of the packaging machine shown in FIG. 1.

Referring now to FIG. 2, the drive train assembly 33 includes a drive sprocket assembly 31, three idler sprocket assemblies 29, flight bar chains 27A, 27B, 27C, drive shafts 55A, 55B, 55C, drive shaft brakes 53A, 53B, 53C, clutched sprockets 51A, 51B, 51C, a primary drive motor 57, a gearbox assembly 59, and continuously running chains 60AC, 60B. The suffixes A, B, and C indicate which flight bar chain the drive components are associated.

The drive sprocket assembly 31 includes a drive shaft 55B perpendicularly disposed over the path of the packages, a pair of idling step-up sprocket assemblies 65A ortatably mounted to the drive shaft 55B on each side of the path of the packages, a pair of fixed sprockets 67B fixed to drive shaft 55B on each side of the path of the packages, and a second pari of idling step-up sprocket assemblies 65C rotatably mounted to the drive shaft 55B on each side of the path of the packages. It should be understood that step-up assemblies 65A, 65C, each include two sprockets: a small driven sprocket and a large driving sprocket.

Figure 3:
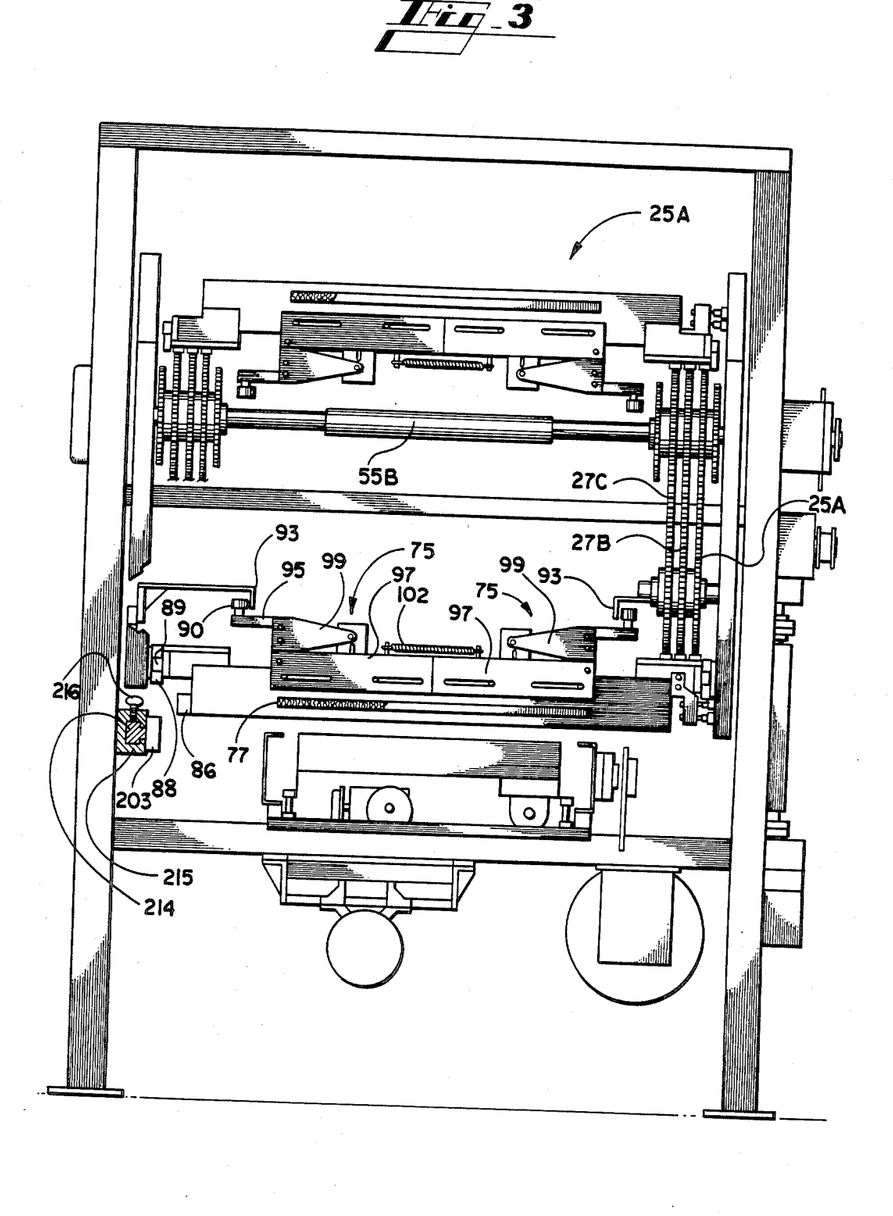
FIG. 3 is an end plan view of the packaging machine shown in FIG. 1.

It may be seen that the drive train assembly includes six flight bar chains: a pair of flight bar chians 27A, a pair of flight bar chains 27B, and a pair of flight bar chains 27C. Each pair of flight bar chains includes one flight bar chain on each side of the path of the packages. Furthermore, each pair of the flight bar chains travel on an orbital path dictated by one sprocket in the drive sprocket assembly 31, and one sprocket in each of idle sprocket assemblies 29. For example, each chain 27A passes around a sprocket assembly 65A and three sprockets 29A. The ends of the flight bars 27A, 27B, 27C are attached between corresponding flight bar chains 25A,25B, and 25C, as shown in FIG. 3. As discussed later in this application, the movement of each set of chains is independently mechanically synchronized, that is, each chain set moves independently of the other two sets. As the flight bars 25A, 25B, 25C, are attached between the flight bar chains 27A, 27B, 27C, respectively, it may be seen that the flight bars move along an orbital path similar to the chains. Furthermore, it may be seen that this orbital path is composed of four linear paths: two horizontal paths, and two vertical paths, which are joined to form a substantially rectangular orbital path. One linear path of particular importance is the lower horizontal path, in which the welding and cutting processes occur, which will be discussed in more detail later in this application.

Operation of the drive train assembly 33 is now discussed. The drive motor 57 operates at a constant speed during the packaging process. The drive motor 57 operates gearbox assembly 59 on the left side of the packaging apparatus 20 through a direct chain drive. The gearbox assembly 59 drives infeed conveyor chain 61, which is operably connected to the infeed conveyor 35 (see FIG. 1). The gearbox assembly 59 also drives continuously running chains 60AC and 60B also on the left side of the packaging apparatus. Continuously running chain 60AC drives shafts 55A and 55C, and thus drives clutched sprockets 51A, 51C. Continuously running chain 60B similarly drives shaft 55B and clutched sprocket 51B. Clutched sprockets 51A, 51B, 51C, are mounted on the left end of corresponding drive shafts 55A, 55B, 55C which are disposed across the path of the packages. By operation of the clutches in the clutched sprockets 51A, 51B, 51C, the drive shafts 55A,55B, 55C, may be selectively clutch driven by the continuously running chains 60AC, 60B. By way of example, drive shaft 55A is driven by continuously running chain 60AC when the clutch in clutched sprocket 51A is engaged.

Flight bar chains 27A, 27B, 27C are directly driven by drive shafts 55A, 55B, 55C through a series of sprockets and chains now discussed.

Flight bar chains 27A are driven by the larger driving sprocket in idling step-up sprocket assemblies 65A. As previously discussed, idling step-up sprocket assemblies 65A are free to rotate about drive shaft 55B. The smaller driven sprockets in the step-up sprocket assemblies 65A are driven by drive shaft 55A by a connecting chain 56A and a sprocket fixed to drive shaft 55A. Therefore it may be seen that the drive shaft 55A drives both idling step-up sprockets 65A in synchronism, in turn driving both flight bar chains 27A in synchronism.

Flight bar chains 27B are driven by the fixed sprockets 67B which are fixed to drive shaft 55B, as previously discussed. Therefore it may be seen that the drive shaft 55B drives both fixed sprockets 57B in synchronism, in turn driving both flight bar chians 27B in synchronism.

Flight bar chains 27C are driven by the larger driving sprockets in the idling step-up sprocket assemblies 65C. The idling step-up sprocket assemblies 65C are free to rotate about drive shaft 55B as previously discussed. The smaller driven sprockets in the step-up sprocket assemblies are driven by drive shaft 55C by a connecting chain 56C and fixed sprocket configuration. Therefore it may be seen that the drive shaft 55C drives both idling step-up sprockets 65C in synchronism, in turn driving both flight bar chains 27C in synchronism.

The shaft brakes 53A, 53B, 53C, are operably associated with the drive shafts 55A, 55B, 55C, such that each brake may selectively engage and lock the rotational positions of its associated drive shaft. The brakes are normally engaged by springs (not shown) and selectively disengaged by pneumatic pressure against the spring pressure, in a known manner. The brakes are of sufficient strength to lock the positions of the drive shafts even if the previously discussed clutches are engaged. Thus, when a brake is engaged, the associated chain and flight bars are fixed in position.

Therefore, assuming that motor 54 is continuously operating, it may be seen that movement of the flight bars 25A, 25B, 25C (and the attached flight bars) is dependent upon the modes of operation of the associated clutch sprockets 51A, 51B, 51C, and the associated brakes 53A, 53B, 53C. If it is desired to hold the flight bars 27A stationary and rigid regardless of the mode of operation of clutch sprocket 51A (for reasons disclosed later in this application), shaft brake 53A is engaged. The movement of flight bars 27B, 27C, are similarly controlled by the operation of clutch sprockets 51B, 51C, respectively, and shaft brakes 53B, 53C, respectively.

Flight Bars

Referring now to FIG. 3, a more detailed description of the structure and operation of two representative flight bars 25A, 25B, is now made. For purposes of this discussion, it will be assumed that flight bar 25A is disposed at the top of FIG. 3, and is drawn toward the viewer when in movement. It will also be assumed that flight bar 25B is in the lower middle part of FIG. 3, and is drawn away from the viewer when in movement. That is, machine 20 is received fromt he left of FIG. 1.

Figure 5:
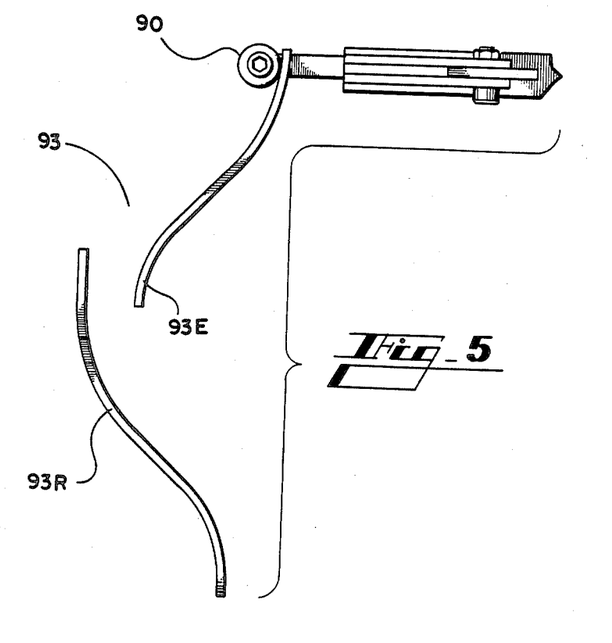
FIG. 5 is an isolated view of the interaction of the cam tracks and the cam follower of the cutting assembly of FIG. 4.
Figure 6:
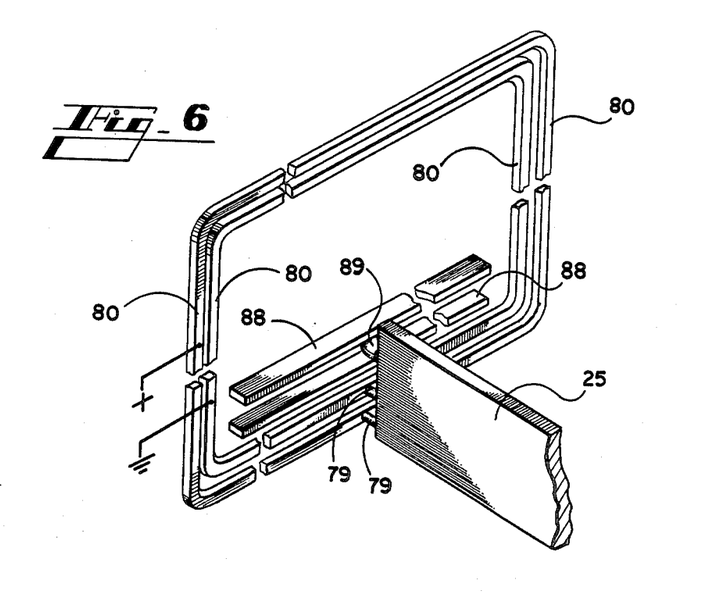
FIG. 6 is a diagrammatic illustration of the bus bar loops and the flight bars shown in FIGS. 1 and 4.
Figure 9:
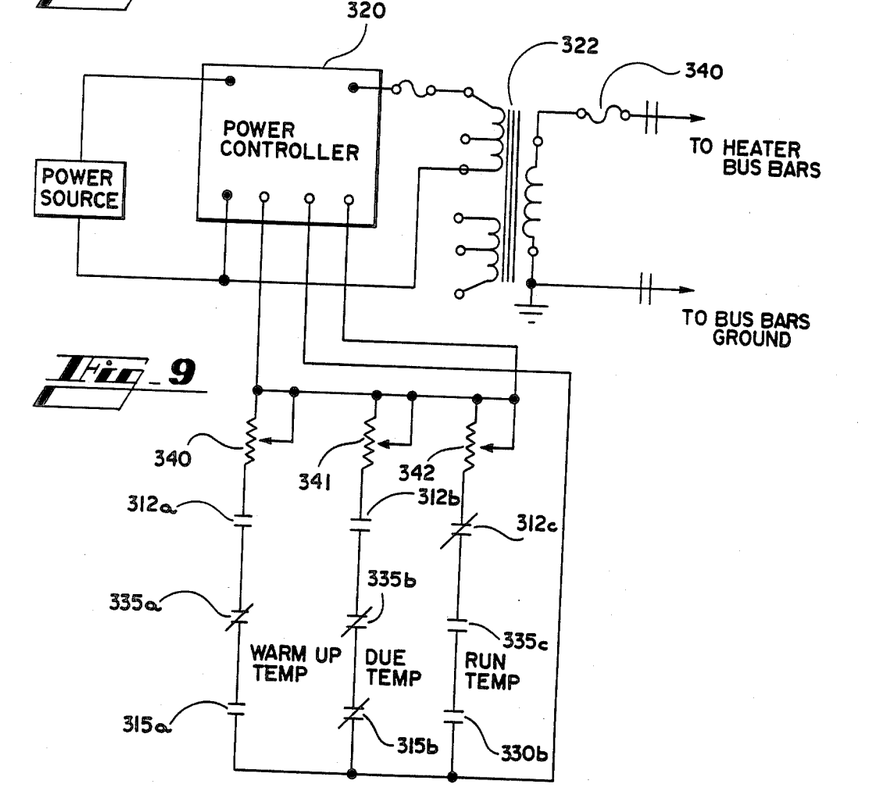
FIG. 9 is a schematic illustration of the electrical control circuit for supplying power to the heating strips on the flight bars shown in FIG. 4.
Figure 12:
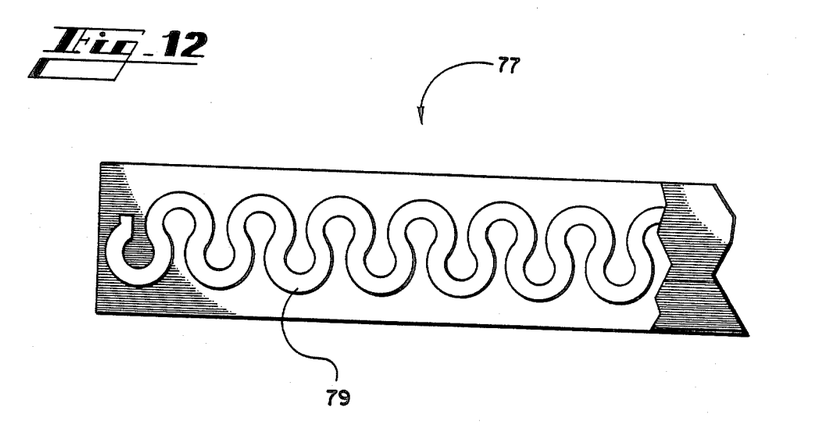
FIG. 12 is an isolated view of one of the heater strips, illustrating the serpentine configuration of the electrically energized wire.

The flight bars each include two film cutting assemblies 75 disposed on top of each flight bar, which coact with corresponding cam tracks 93 rigidly mounted on each side of the path of the packages, to cut the film 22 (not shown in FIG. 3) in a manner disclosed in further detail further in this application. Heating strips 77 are also provided on each of the two planar surfaces of each flight bar. As previously discussed, the heating strips raise the temperature of the film such that the film partially melts and is welded to the cartons. Referring now to FIG. 12, the heating wire 78 in the heating strips 77 is of a serpentine configuration, which reduces the tendency of the heating strips to expand and deform when hot. Referring now to FIGS. 3, 5 and 6, electrical current energizes the heating strips 77, and is supplied to the flight bars by a contact connection between two brushes 79 extending from the right butt end of each of the flight bars 25, and two stationary bus bar loops 80 fixed to the right side of the frame of the packaging machine 20. The bus bar loops 80 are configured such that the brushes 79 are in constant contact with the bus bar loops throughout the orbital travel of the flight bars. Wiring (not shown) connects the brushes 79 to the heating strips 77. A voltage supply, shown diagrammatically in FIG. 9, provides a potential difference between the two bus bar loops 80.

End rollers 89 are rotatably mounted at each butt end of each of the flight bars 25 such that the end rollers may rotate about an axis substantially parallel to the longitudinal axis of the flight bars 25. Guide bars 88 are rigidly attached to the frame of the packaging machine 20, and form two inwardly facing channels configured to accept the end rollers 89, and stabilize the flight bars 25 throughout the welding and cutting processes. Referring particularly to FIG. 6, a diagrammatic representation not shown to scale, it may be seen that the guide bars 88 extend alongside the flight bars 25 in the lower horizontal path of travel of the flight bars.

Referring now to FIG. 3, photocell groups 201, 202, 203 are positioned on the frame of the machine, and are directed to shine upon reflectors 86 positioned on the left butt end of each of the flight bars 25. As will be discussed later in this application, the photocell groups 201, 202, 203 are positioned at various precise locations along the path of the flight bars, and the interaction of the photocell groups and the reflector groups 86 provide position indicating means for controlling the movements of the flight bars during the welding and cutting processes.

The flight bar chains 27A, 27B, 27C, each have one link rigidly attached to a corresponding flight bar 25A, 25B, 25C. As will be discussed later in the application, a pair of cam followers 90 are mounted to the top of each flight bar 25, and interact with the cam tracks 93 positioned adjacent to the lower horizontal path of travel of the flight bars to facilitate cutting of the film after the film is welded to the boxes.

Film Cutting

Figure 4A:
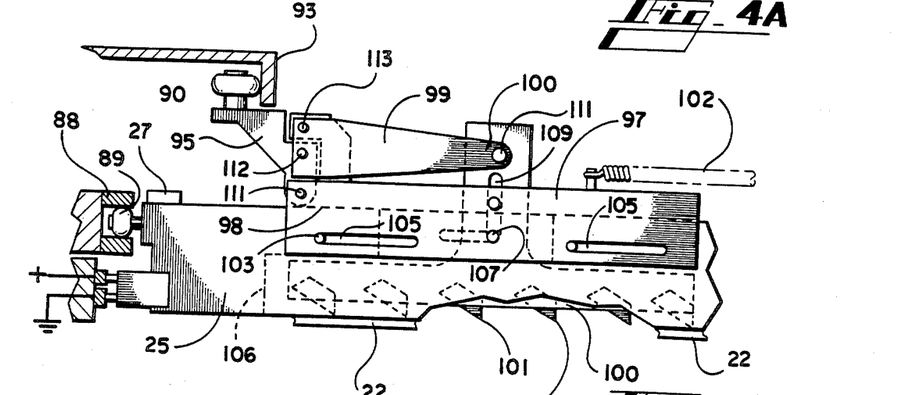
FIGS. 4A, 4B, and 4C are diagrammatic step-by-step illustrations of the assembly and operation of the cutting assemblies of the packaging machine of FIG. 1.
Figure 4B:
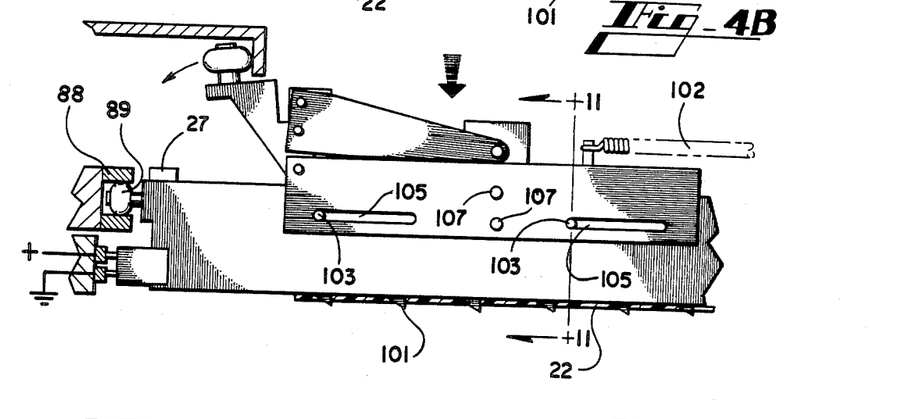
Figure 4C:
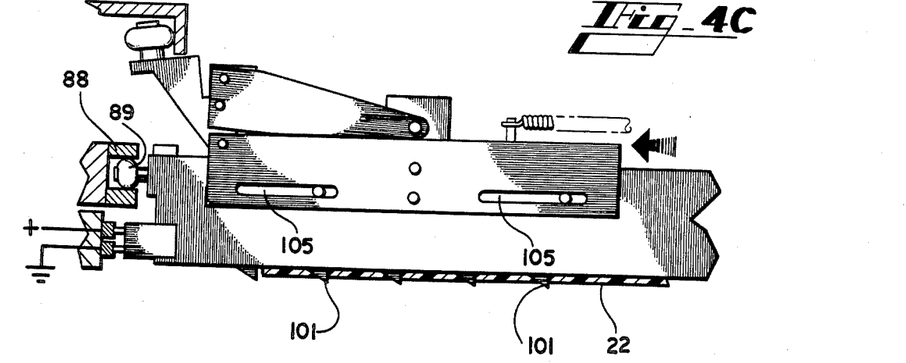

Referring now to FIGS. 4A, 4B, 4C, and 10, the construction and operating of a representative cutting assembly 75 on one side of a representative flight bar 25 is now discussed. It should be understood that FIGS. 4A, 4B, 4C, illustrate the sequence of the cutting action of the cutting assembly 75, with FIG. 4A illustrating the cutting assembly 75 at rest, and FIGS. 4B, 4C, illustrating positions of the cutting assembly during various stages in the cutting operation.

Each cutting assembly 75 includes a cam follower 90, a cam follower mount 95, a knife slide 97, a pivot arm 99, a knife mount 100, and film cutting knives 101. These components can be constructed of lightweight materials such as aluminum or, as in the case of the slide 97, nylon or plastic. Cam follower mount 95 is pivotally attached to the knife slide 97 at pivot point 111, and is pivotally attached to the pivot arm 99 at pivot point 112. The pivot arm 99 is also pivotally attached to the knife slide 97 at pivot point 113. The knife slide 97 has a downwardly facing channel 98 which accepts the upper edge of the body of the flight bar 25, such that the knife slide may slide upon the flight bar along a path substantially parallel to the longitudinal axis of the flight bar. Pins 103 rigidly fixed to the flight bar 25 fit within slots 105 in the knife slide 97, and limit the horizontal travel of the knife slide relative to the flight bar 25. A return spring 102 is attached to the knife slide 97 and is similarly attached at the other end to the other cutting assembly on the other end of the flight bar (see FIG. 3).

The flight bars 25 each define an inner passage 106 in the shape of an inverted "T" which conceals the knife mount 100 and attached knives 101 when the knives are not in use. The knife mount 100 is slidably mounted to the knife slide 97 by means of pins 107 rigidly attached to the knife slide 97 which fit into a corresponding slot 109 defined by the knife mount 100. A horizontal slot 108 defined in the flight bar 25 is provided to allow the lower pin 107 to pass through the flight bar and move horizontally relative to the flight bar during the cutting action. The knife mount 100 is pivotally attached to the arm 99 at a pivot point 114.

The cutting action of the flight bars 25 is now discussed. One of flight bar chains 27 moves its associated flight bar 25 such that the end rollers 89 roll within the guide channels 88, and the cam follower 90 encounters the arcuate cam track 93. Referring now to FIG. 5, it may be seen that the arcuate cam track 93 includes an extension element 93E and a return element 93R. It should be seen that as the cam follower 90 encounters and contacts the extension element 93E, the cam follower is forced toward the exterior of the machine. Similarly, the cam follower 90 is forced inwardly when contacting the return element 93R.

Referring now to FIG. 4A, the position of a representative cutting assembly 75 at its fully retracted position is shown. It should be understood that the cutting assembly 75 is in this position at all times except during the cutting process. As shown in FIG. 4B, as the flight bar is drawn further along its path of travel, the extension element 93 E forces the cam follower 90 outwardly, in turn forcing the cam follower mount 95 to pivot counterclockwise about its pivoting connection 111 relative to knife slide 97. As previously discussed, the cam follower mount 95 is pivotally attached at point 112 to a pivoting arm 99. Therefore, as the cam follower mount 95 pivots, it forces pivot arm 99 to pivot clockwise about pivot point 113 relative to knife slide 97. Also as previously discussed, pivot arm 99 is pivotally mounted at pivot point 114 to knife mount 100, which is in turn slidably mounted to knife slide 97 along a vertical path dictated by pins 107. Therefore it may be seen that the knife mount 100 is forced downward when the pivot arm 99 pivots clockwise. This in turn forces the attached knives 101 downwardly and out of their concealed position within the flight bars 25, to pierce the film sheet 22 disposed on the lower edge and the flight bar.

Therefore in partial summary it may be seen that as the cam follower 90 is initially forced outwardly by the arcuate track 93, the knife blades are forced downwardly through the film sheet.

As the pivot arm 99 pivots relative to the knife slide 97, it eventually contacts and "bottoms out" on the upper surface of the knife slide, and further pivoting of the pivot arm is thus prevented. Therefore it may be seen that further downward travel of the knives 101 is likewise prevented.

After the pivot arm 99 has "bottomed out" on the knife slide 97, the arcuate cam track 93 continues to urge the cam follower 90 outwardly. As previously discussed, the knife slide 97 is slidably attached to the flight bar 25 along a path dictated by the pins 103 rigidly attached to the flight bar, and the slots 105 in the slide bar 97. As the force on the cam follower 90 increases, the spring tension is overcome and the cam follower 90, cam follower mount 95, pivot arm 99, knife mount 100, knives 101, and knife 97 all slide outwardly relative to the flight bar 25, as shown in FIG. 4C. It should be understood that no pivoting about points 111, 112, 113 and 114 occurs during the sliding process.

As the knives 101 slide outwardly relative to the flight bar 25, it may be seen that the film sheet displaced over the lower edge of the flight bars 25 is completely cut.

After the cutting is complete, the steps set forth in reference to FIGS. 4A-4C are reversed in order to retract the knives in to their concealed positions. Referring now to FIG. 5, a return track 93R is provided which forces the cam follower 90 inwardly, thus reversing the aforementioned knife extending process. The return spring 102 assists this retraction process.

Flight Bar Clutch and Brake Operation

As described above, three sets of flight bars, 25A, 25B, 25C, mounted on each of the drive chains 27A, 27B, 27C, respectively, are moved into contact with trays being wrapped by the system by operation of the flight bar chains and corresponding associated clutches and brakes. This operation is controlled according to the electrical schematic shown in FIG. 7. The sequence and control of such movement will be described with reference to FIGS. 10A through 10D, which show sequential positions of the apparatus as unwrapped packages are fed into the wrapping station from the infeed conveyor 35.

Figure 10A:
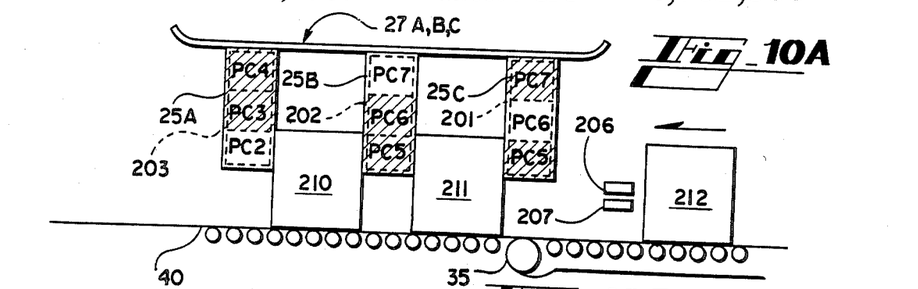
FIGS. 10A, 10B, 10C, and 10D are diagrammatic step-by-step illustration of the operation of the flight bars.

FIG. 10A shows an assumed starting position with flight bars 25A and 25B holding a package 210 in compression and flight bars 25B and 25C holding a package 211 in compression. Shaft brakes 53A, 53B and 53C are retaining chains 27A, 27B, and 27C against movement, and clutches and sprockets 51A, 51B, 51C, are disengaged. Another package 212 is moving toward a pair of limit switches 206 and 207 located along the infeed conveyor on opposite sides of the path of the package 212. The flight bars 25A, 25B, and 25C are positioned inthe path of the beams of three photocell groups 203, 202 and 201, respectively. These photocell groups are mounted on the frame, and are shown in dotted lines in FIG. 10 when blocked by a flight bar. Photocell group 201,nearest the infeed conveyor, comprises three vertically stacked photocell transmitter/receivers labeled (from top to bottom) PC7, PC6, and PC5. Photocell group 202 is spaced apart from group 201 by slightly less than the length of one package, for a purpose explained below. Group 202 also comprises photocell transmitter receivers PC7, PC6, and PC5, which provide the same output signals as group 201. The photocell group 203 is spaced apart from group 202 by a similar distance, and comprises photocell transmitter/receivers PC4, PC3, and PC2. The edges of the flight bars opposite the photocells are coated with reflective and non-reflective material so as to uniquely identify each flight bar. The non-reflective areas are indicated by hatching of the flight bars in FIGS. 10A-10D. When a reflective coating is opposite a particular photocell, the photocell transmits a signal to the control circuitry with a result as described below.

Figure 7:
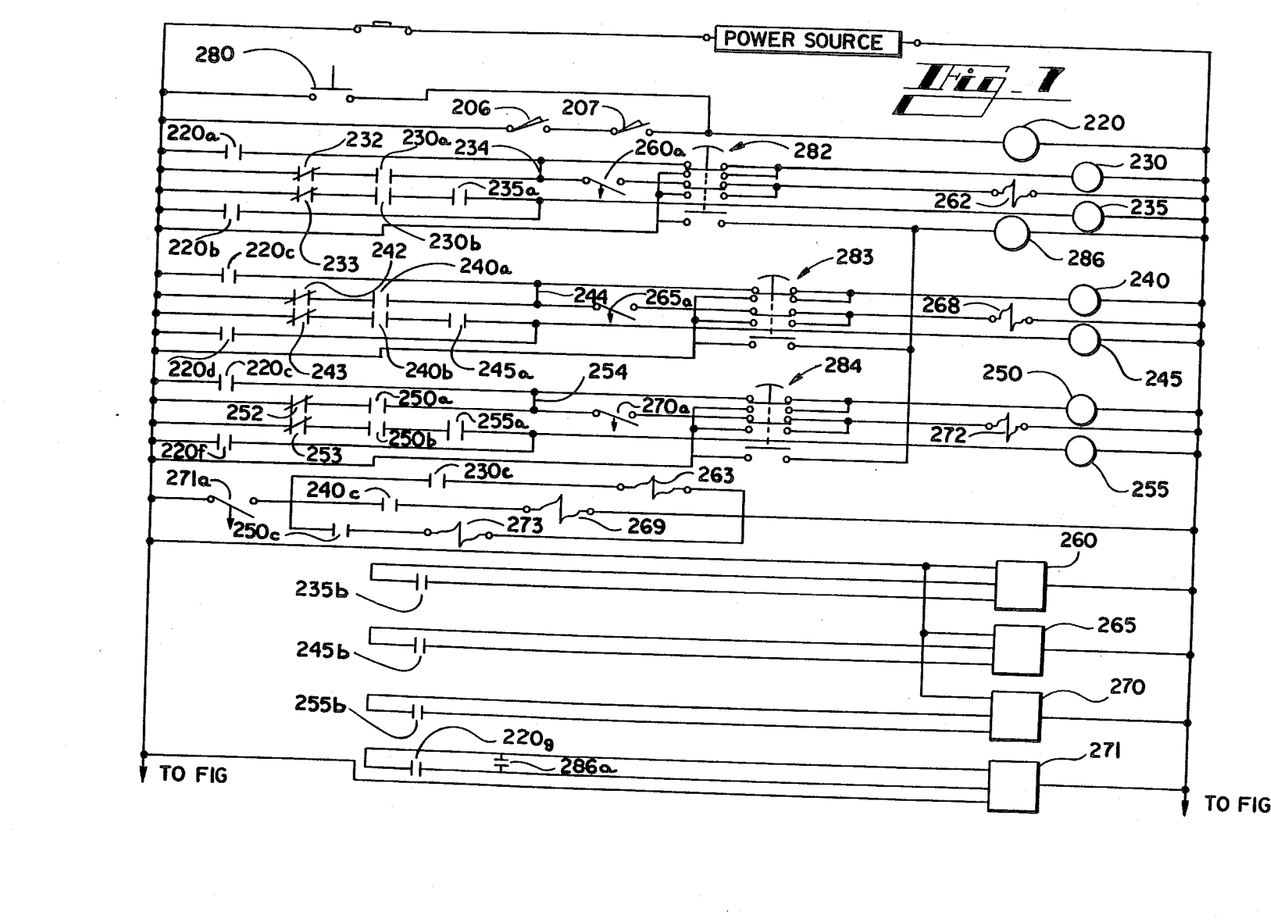
FIGS. 7 and 8 combine to illustrate a schematic view of the electrical control circuit for operating the flight bars of the packaging machine of FIG. 1.

When the package 212 breaks both limit switches 206 and 207, power is supplied to a cycle initiation relay 220, shown in FIG. 7, an electrical schematic for the braking and clutch system. To limit switches are used as a safety factor to prevent accidental activation of the apparatus. Relay 220 remains energized until the package clears both limit switches. Relay 220 beings movement of the compression unit as follows. Contacts 220a are closed, energizing a relay 230 associated with flight bar 25B. Relay 230 in turn closes contacts 230a. A set of normally closed contacts 232 connected to the photocell PC4 is connected in series with contacts 230a, and is closed since a non-reflective surface on the flight bar 25A is opposite photocell PC4 in the position shown in FIG. A. Thus, power is supplied across a jumper 234 to maintain power to relay 230 even after relay 220 is deenergized.

The relay 230 also closes a set of contacts 230b in series with a set of normally closed contacts 233 connected to the photocells, PC7. In the position of the flight bars shown in FIG. 10A, the PC7 photocell of the group 202 is opposite a reflective surface and contacts 233 are initially open.

Relay 220 also closes a set of contacts 220b, energizing a clutch control relay 235 associated with the drive chain 27B. This closes a set of contacts 235a, for the purpose of continuing power to the relay 235 when relay 220 is deenergized and contacts 233 become closed, as explained below.

A set of contacts 235b is also closed, which energizes a time delay relay 260, of the "delay break" mode. A time delay switch 260a is thereby closed, and remains closed until a fixed delay period, following deenergization of the time delay relay 260. This delay may be, for example, 0.06 seconds to 6 seconds, depending on the speed of the drive chains. Thus, power is supplied to a pneumatic valve 262 which retracts the break 53B associated with the flight bar 25B. The breaks 53A, 53B, and 53C are normally held in position engaging he flight bars by a spring (not shown) unless retracted pneumatically.

The relay 220 also closes a set of contacts 220g, which energizes a time delay relay 279 which is in a "delay break" mode. The time delay of relay 271 is relatively long because of the early deenergization of relay 220, and normally will allow a complete cycle as shown in FIGS. 10A-10D to occur. This delay may be, for example, for 2-20 seconds. Energization of relay 271 closes a switch 271a.

The relay 230 also closes a set of contacts 230c in series with the switch 271a, energizing a pneumatic valve 263 which engages the clutched sprocket 51B for drive chains 27B, which carry flight bar 25B. Since the brake 53B has been released,1 the drive chain now begins to move the flight bar 25B, which initially moves away from photocell group 202, resulting in the closing of contacts 233.

When the new package 212 clears the limit switches 206 and 207, they open and relay 220 is deenergized. However, power is still supplied to relay 235. It will be understood from the following description that the other flight bars are also moving so that package 210 is not held against the urging of flight bar 25B.

Similarly, relay 220 closes a set of contacts 220c, energizing a relay 240 associated with flight bar 25C. Relay 240 in turn closes contacts 240a. A set of normally closed contacts 242 connected to the photocell PC3 is connected in series with contacts 240a, and is closed since a non-reflective surface on the flight bar 25A is opposite photocell PC3 in the position shown in FIG. 10A. Thus power is supplied cross a jumper 244 to maintain power to relay 240 even after relay 220 is deenergized.

The relay 240 also closes a set of contacts 240b in series with a set of normally closed contacts 243 connected to the photocells PC6. In the position of the flight bars shown in FIG. 10A, the PC6 photocell of group 201 is opposite a reflective surface and contacts 243 are initially open.

Relay 220 also closes a set of contacts 220d, energizing a clutch control relay 245 associated with the drive chain 27C. This closes a set of contacts 245a, for the purpose of continuing power to the relay 245 when relay 220 is deenergized and contacts 243 become closed. A set of contacts 245b is also closed, which energizes a time delay relay 265, of the "delay break" mode. A time delay switch 265a is thereby closed, and remains closed until a fixed delay period following deenergization of the time delay relay 265. This delay may be, for example, a 0.06-6 seconds. Thus, power is supplied to a pneumatic valve 268 which retracts the brake 53C associated with the flight bar 25C.

The relay 240 also closes a set of contacts 240c, in series with the switch 271a and in parallel with the contacts 230c, energizing a pneumatic valve 269 which engages the clutch 51C for drive chain 27C, which carries flight bar 25C. The drive chain 27C moves the flight bar 25C away from photocell group 202, resulting in the closing of contacts 243. Thus, when the limit switches 206 and 207 open and relay 220 is deenergized, power is still supplied to relay 245.

Similarly, relay 220 closes a set of contacts 220e, energizing a relay 250 associated with flight bar 25A. Relay 250 in turn closes contacts 250a. A set of normally closed contacts 252 connected to the photocell PC2 is connected in series with contacts 250a, and is initially open since a reflective surface on the flight bar 25A is opposite photocell PC2 in the position shown in FIG. 10A. Thus, power is not initially supplied across a jumper 254 to maintain power to relay 250. However, power to relay 250 is maintained for a short period as the package 212 moves past the limit switches 206 and 207, and is maintained because of movement of the flight bars as described below.

The relay 250 also closes a set of contacts 250b in series with a set of normally closed contacts 253 connected to the photocells PC5. In the position of the flight bars shown in FIG. 10A, the PC5 photocell of group 201 is opposite a nonreflective surface and remains closed.

Relay 220 also closes a set of contacts 220f, energizing a clutch control relay 255 associated with the drive chain 27A. This closes a set of contacts 255a, continuing power to the relay 255 when relay 220 is deenergized. This also closes a set of contacts 255b, which energizes a time delay relay 270, of the "delay break" mode. A time delay switch 270a is thereby closed, and remains closed until a fixed delay period following deenergization of the time delay relay 270. This delay may be, for example, 0.06-6 seconds. Thus, power is supplied to a pneumatic valve 272 which retracts the brake 53A associated with the flight bar 25A.

The relay 250 also closes a set of contacts 250c, in series with the switch 271a and in parallel with the contacts 230c and 240c, energizing a pneumatic valve 273 which engages the clutch 51A for drive chain 27A, which carries flight bar 25A. The flight bar 25A thereby begins to move, initially removing the reflective surface from opposite photocell PC2, thereby closing contacts 252 and maintaining power to relay 250 across jumper line 254.

Figure 10B:
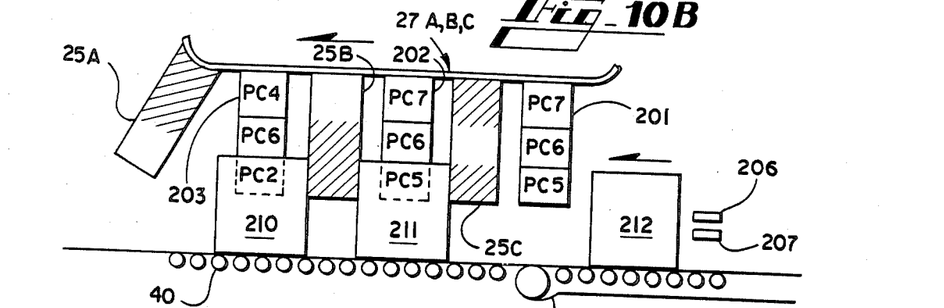

It will be understood that now all flight bars are moving, and the packages 210 and 211 are moving with the flight bars. As shown in FIG. 10B, the package 212 has cleared the limit switches 206, 207 and is in the process of catching up with the moving flight bar 25C. The flight bars are all positioned away from the groups of photocells, so that no photocell is transmitting a signal to its respective contacts shown in FIG. 7. Flight bar 25A has begun to travel around the path of the chain 27A, independently of the chains 27B and 27C. It will be understood that the cams 93 are positioned so that cutting of the film between packages 210 and 211 is accomplished by the knives on the flight bar 25B, as described above, upon movement of the flight bar 252 away from its position shown in FIG. 10A.

Figure 10C:
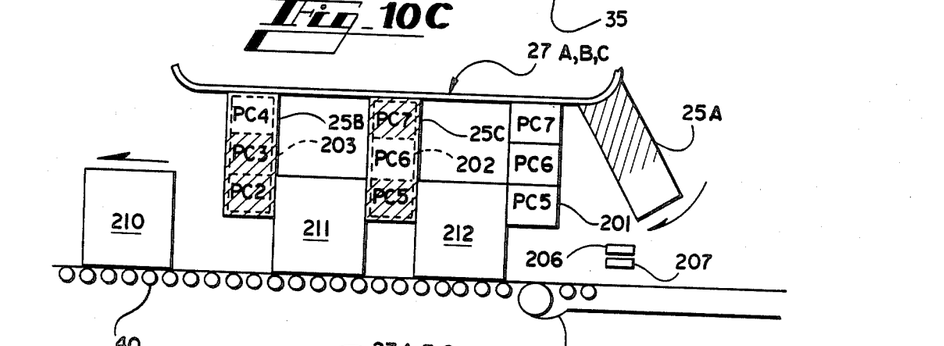

In FIG. 10C, the flight bars 25B and 25C have reached positions opposite photocell groups 203 and 202, respectively. When the flight bar 25B reaches the photocell group 203, it places a reflective surface opposite the photocell PC4. This opens the contacts 232, immediately deenergizing the valve 262 and causing the brake 53B to lock the chain 27B against further movement. The opening of the contacts 232 also results in deenergizing the relay 230, which in turn results in opening the contacts 230c, inactivating the clutched sprocket 51B which was driving the drive chain 27B. It will be seen that a flight bar reaching the photocell group 203 is immediately fixed in position by the simultaneous engagement of the appropriate brake and disengagement of the appropriate clutch.

The deenergizing of the relay 230 also breaks the contacts 230a and 230b, the latter causing the deenergization of the relay 235. Contacts 235b are opened, deenergizing the time delay relay 260, allowing the switch 260a to time out and open. The control circuitry associated with the flight bars on the drive chain 27B are now ready for the next new package.

When the flight bar 25C reaches the photocell group 202, a reflective surface is placed opposite the photocell PC6, as shown in FIG. 10C. This causes the contacts 243 to open, deenergizing the relay 245. As a result, contacts 245a and 245b are opened, the latter resulting in deenergization of the time delay relay 265. Thus, after a time delay, preferably 0.06–6 seconds, the switch 265a opens and the brake valve 268 is deenergized, causing the brake 53C to lock the drive chain 27C. It will thus be seen that the clutch 51C remains engaged for the time delay of relay 265 before the brake 53C locks. As a result, the flight bar 25C compresses the package 211 against the locked flight bar 25B to obtain compression forces for sealing the film to the package. This accomplished, the brake 53C is applied to retain the compression.

Figure 10D:
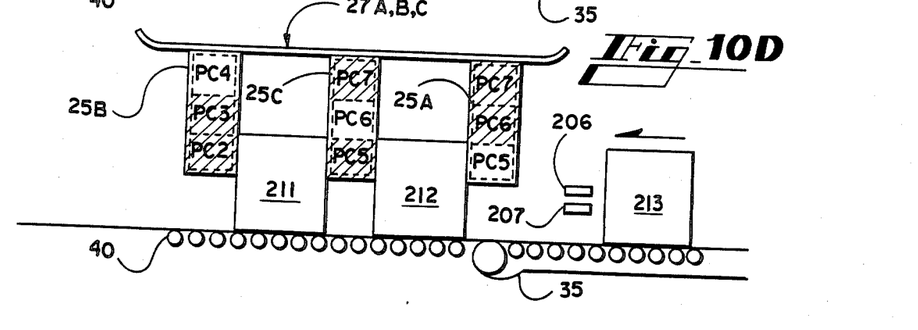
Figure 11:
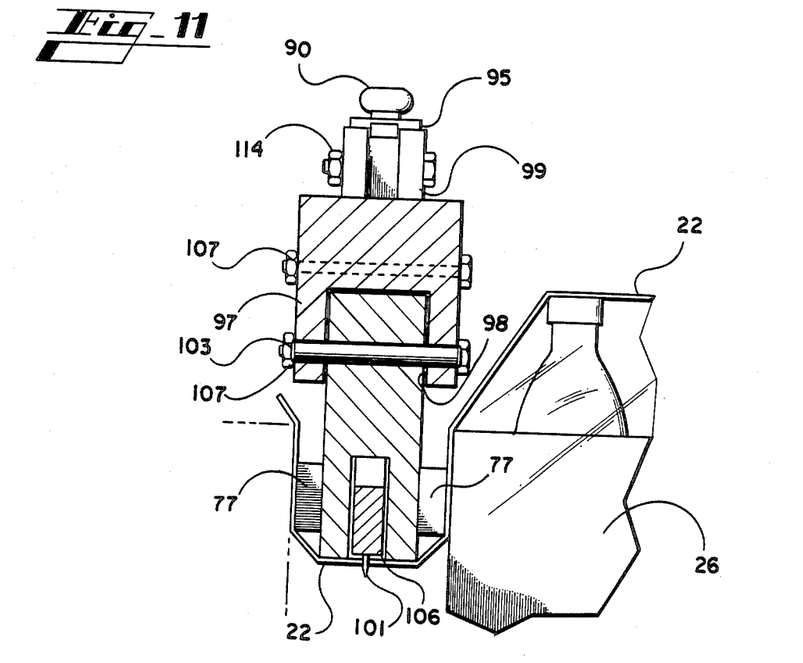
FIG. 11 is a side cutaway of a flight bar along line 11-11 in FIG. 4B, with the addition of film and packages.

In the meantime, the package 212 has come into contact with the trailing side of flight bar 25C. When the next flight bar 25A of the three attached to the drive chain 27A reaches the photocell group 201, a reflective surface is placed opposite the photocell PC5, as shown in FIG. 10D. This causes the contacts 253 to open, deenergizing the relay 255. As a result, contacts 255a and 255b are opened, the latter resulting in deenergization of the time delay relay 270. Thus, after a time delay, preferably 0.06–6 seconds, the switch 270a opens and the brake valve 272 is deenergized, causing the brake 53A to lock the drive chain 27A. It will thus be seen that the clutch 51A remains engaged for the time delay of relay 270 before the brake 53A locks. As a result, the flight bar 25A compresses the package 212 against the restraining force of the locked flight bar 25B to obtain compression forces for sealing the film 22 to the package 212.

At a time subsequent to the above-described events, the time delay relay 271 times out, and opens the contacts 271a, disengaging the clutches 51A and 51C. However, if another packge 213 passes the limit switches 206 and 207 before the relay 271 times out, the relqy 271 will again be energized as described above, beginning a new cycle and enabling the clutches to obtain power at the appropriate times. As an example of the time involved in a.cycle, the packages may be moving at an overall speed through the apparatus of 80–100 centimeters per minute (30 cycles per minute), with the time delays as follows: relay 260 at 0.08 seconds; relay 265 at 0.08 seconds; relay 270 at 0.09 seconds; relay 271 at 3.6 seconds.

It will be appreciated from the foregoing that the flight bar approaching the photocell group 203 nearest the outfeed end of the compression and sealing section has its clutch and brake switched simultaneously, while the following flight bars are urged forward for a time against the restraining force of the locked flight bar, to obtain compression forces for sealing. The compression forces exerted by the clutches may be varied by adjusting the voltage applied to the clutches using well known circuitry.

Referring again to FIG. 7, an overall jog switch 280 is provided which duplicates the result of closing both limit switches 206 and 207. That is, closing the switch 280 causes a cycling of the flight bars manually without the presence of a package. Also provided are three chain jog switches 282, 283, and 284, which release the brake for a particular one of the drive chains 27A, 27B, and 27C, respectively, and energize a jog relay 286. The relay 286 closes a set of contacts 286a which causes energization of the time delay relay 271 to provide power to the clutches as described above.

Welding Heater Operation

As described above, each flight bar 25A, 25B, and 25C has a pair of heater strips attached along opposite sides of the flight bar in a position so as to compress the film against the material of the trays being wrapped, as shown in FIG. 1. Power is supplied to the resistance heating strips according to the control circuitry shown in FIGS. 8 and 9, and is supplied independently of the operation of the flight bar clutches and brakes described above.

When it is desired to run the packaging apparatus 20, a weld heater switch 310 is turned on, supplying power to energize a relay 312. The relay 312 closes contacts 312a and and 312b, and opens normally closed contacts 312c. Closing of the on/off switch 310 also energizes a time delay relay 315 of the "delay make" type. This relay may have a time delay of, for example, 2–20 seconds. It is shorted to be immediately deenergized and begin to time out. A set of contacts 351a in series with the contacts 312a is thereby closed, causing a signal to be transmitted to a power controller 320 which, in response, initiates power at a level of about 5 volts through a transformer 322 to the heater strip bus bar loops 80. This voltage prevents a larger power surge through protective fuses at a later time, and warms the heater strips to a low temperature.

Assuming the relay 315 times out before any packages approach the compression and sealing station, the contacts 315a open and another set of normally closed contacts 315b close. The contacts 315b are in series with the contacts 312b, and upon closing cause a signal to be transmitted to the power controller 320 which, in response, initiates power at a level of about 8-10 volts through the transformer 322 to the heater strip bus bars. At this level of power, the heater strips are in an idle condition, and their temperatures are below that which could cause them to burn through the film 22. This temperature might be, for example, 180-200 degrees F., and is applied continuously to the heater strips unless either (a) the equipment is turned off at the switch 310, or (b) a package approaches.

When a package moves toward the compression and sealing station, it breaks the beam of a photocell 38, shown in FIG. 1. Breaking of the beam causes a signal to be transmitted closing a set of contacts 325 in series with the contacts 315c. As a result, a time delay relay 330 is energized. Time delay relay 330 is in a "one shot" mode, providing an output signal for about 16-160 seconds. This output causes a time delay switch 330a to close for the duration of the output, energizing a relay 335. The relay 335 in turn opens two normally closed sets of contacts 335a and 335b, which terminate the idle level signal to the power controller 320 and prevent any occurrence of a warm up level signal to the power controller. Also, a set of contacts 335c is closed and a set of contacts 335d is opened, deenergizing the relay 312. A set of contacts 330b in series with the contacts 335c is closed by the time delay relay 330, and since the contacts 312c are now again closed, a signal is transmitted to the power controller 320 to provide a voltage of about 17 volts to the heater strip bus bars. Such a voltage heats the strips to a welding temperature of about 280-300 degrees F., sufficient to weld the film to the sides of the packages given the length of time the packages are under compression.

When the signal provided by relay 335 times out, the switch 330a opens, deenergizing relay 335. The following situation results. Contacts 335d become closed, energizing relay 312. No warm up signal is provided because contacts 312a are closed, 335a are closed, and 315a are open. No run temperature signal is provided because contacts 312c are open, 335c are open and 330b are open. The idle temperature signal is provided because contacts 312b are closed, 335b are closed, and 315b are closed. The idle temperature is provided to the heater strips until the run temperature is activated by another package or the system is turned off.

If another package breaks the beam of photocell before the relay 330 times out, the relay 330 is reset and the run temperature voltage continues to be provided until the relay 330 is allowed to time out. The relay 330 is in a one shot mode so that a package stopping in the beam of the photocell will not cause the heater strips to be held at run temperature indefinitely.

Figure 8:
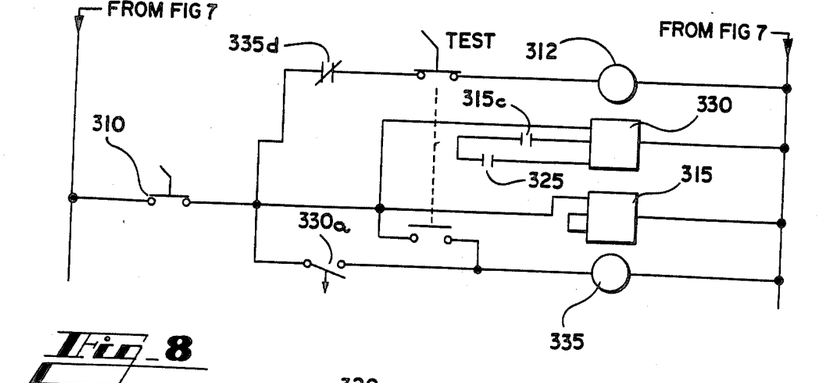

Thus, it will be seen that a low voltage power supply system is provided to all of the flight bars without individual temperature feedback controls for each heater strip on each flight bar. Complex heater controls used on prior machines of this type have been eliminated. The system of FIGS. 8 and 9 is much less expensive to manufacture and consumes much less power than prior sysstems. THe circuit is easily protected by fuses, such as fuse 340, and therefore is not damaged by heter strip short circuits, as was the case with prior systems.

The voltage applied to the heater strips in the warm-up, idle, and run modes can be varied using potentiometers 340, 341, and 342, respectively.

It should be understood that the foregoing relates only to a preferred embodiment of the present invention, and that numerous changes and modifications may be made therein without departing from the spirit or scope of the invention as set forth in the following claims.

I claim:
1. A machine for packaging articles in a container having a leading wall and a trailing wall, comprising:
   means for guiding a plurality of said containers along a path of travel;
   means for disposing a sheet over a plurality of said trays;
   a first flight bar;
   first transport means for moving said first flight bar in an orbital path, said orbital path including a path segment extending along said path of travel of said containers;
   a second flight bar;
   second transport means for moving said second flight bar in said orbital path;
   a third flight bar; and
   third transport means for moving said third flight bar in said orbital path;
   said first, second and third transport means operating independently of one another;
   such that during said path segment said film sheet is pressed by one of said flight bars against the leading wall of said containers, by another of said flight bars against the trailing wall of said one container and against the leading wall of another of said containers, and against the trailing wall of said other container by the remaining flight bar.

2. The packaging machine of claim 1, further comprising:
   a first position detector located along said path segment adjacent to an outfeed end of said path segment;
   a second position detector located along said path intermediate the ends of said path segment;
   a third position detector located along said path segment adjacent to an infeed end of said path segment;
   each of said position detectors determining when a flight bar is opposite said detector and which of said flight bars is opposite said detector;
   means for fixing the position of any of said flight bars responsive to said flight bar reaching said first position detector; and
   means for fixing the position of any of said flight bars a predetermined time after said flight bar reaches said second or third position detectors.

3. The machine of claim 2, wherein said transport means comprise clutches and wherein said means for fixing the position of said flight bars comprise brakes associated with said transport means; said clutch and brake associated with one of said flight bars reaching said first position detector being immediately and simultaneously disengaged and engaged, respectively; and said brake associated with one of said flight bars reaching said second or third position detectors being engaged after said predetermined time without disengaging the corresponding clutch associated with said flight bar.

4. The machine of claim 1, further comprising:
   electrical heater strips mounted along both sides of each of said flight bars such that said heater strips engage said film sheet when said flight bars press said film sheet against the walls of said containers; and means for applying a heating voltage of the same value to all of said heater strips.

5. The machine of claim 4, wherein said heater strips comprise serpentine heating elements applied directly to said film.

6. The machine of claim 4, wherein said means for applying said heating voltage comprises:
   means for applying a non-welding idle voltage to said heater strips; and
   means for applying a welding voltage to said heater strips responsive to a container approaching said path segment.

7. The machine of claim 6 further comprising means for reducing said heating voltage from said welding voltage to said idle voltage responsive to the absence of additional containers for a predetermined time.

8. The machine of claim 6, wherein said means for applying a non-welding idle voltage to said heater strips comprises:
   means for providing an idle level signal; and
   means responsive to said idle level signal for providing said idle voltage to said heater strips; and
wherein said means for applying a welding voltage to said heater strips comprises;
   means responsive to said approaching container for providing a welding level signal for a selected time;
   means responsive to said welding level signal for terminating said idle level signal and for providing said welding voltage to said heater strips; and
   means operative at the end of said selected time and in the absence of containers approaching said path segment for terminating said welding level signal and providing said idle level signal.

9. The machine as claimed in claim 8, wherein said means for driving said first drive sprocket about said first axis comprises;
   a first drive shaft rotatably mounted relative to said frame along said first axis and fixed to said first drive sprocket; and
   means for driving said first drive shaft,
   and wherein said second drive sprocket is mounted to freely rotate upon said first drive shaft such that said second drive sprocket may be driven independently of said first drive sprocket.

10. A machine for packaging articles in trays, comprising:
    means for moving a plurality of flight bars to dispose a continuous sheet of film over said trays and bond said film to said trays;
    at least one film cutting means slidably mounted to each of said flight bars for horizontal and vertical movement with respect to said flight bars;
    a cam follower operably associated with each of said cutting means;
    means for defining a cam surface in the path of each of said cam followers; and
    each of said cam followers traveling along said cam surface so as to cause said cutting means to move vertically to pierce said film, and thereafter to move horizontally to sever a portion of said film.

11. The machine of claim 10, wherein said cam follower travels along said cam surface in a substantially horizontal plane.

12. The machine of claim 10, wherein said cam surface is an extending surface, and further comprising:
    means for defining a retracting surface in the path of said cam followers;
    each of said cam followers traveling along said cam surface so as to cause said cutting means to move horizontally and thereafter vertically to a retracted position.

13. The machine as claimed in claim 10, wherein said cam surface is positioned laterally outside of the path of movement of said trays.

14. A machine for packaging articles in a container having a leading wall and a trailing wall, comprising:
    means for guiding a plurality of said containers along a path of travel;
    means for disposing a sheet of film over a plurality of said trays;
    a first flight bar;
    first transport means for moving said first flight bar in an orbital path, said orbital path including a path segment extending along said path of travel of said containers;
    a second flight bar;
    second transport means for moving said second flight bar in said orbital path;
    said first and second transport means operating independently of one another;
    such that during said path segment said film sheet is pressed by one of said flight bars against the leading wall of one of said containers, and by another of said flight bars against the trailing wall of said one container;
    first positioin detector means located along said path segment for determining when a flight bar is opposite said first detector means;
    second position detector means located along said path segment spaced apart from said first position detector toward the infeed end of said path segment, for determining when a flight bar is opposite said second detector means;
    means for substantially immediately fixing the position of either of said flight bars responsive to said flight bar reaching said first position detector means; and
    means for fixing the position of either of said flight bars a predetermined time after said flight bar reaches said second position detector means.

15. The machine of claim 14, wherein said transport means comprise clutches and wherein said means for fixing the position of said flight bars comprise brakes associated with said transport means; said clutch and brake associated with one of said flight bars reaching said first position detector means being substantially immediately and simultaneously disengaged and engaged, respectively; and said brake associated with one of said flight bars reaching said second position detector means being engaged after said predetermined time without disengaging the corresponding clutch associated with said flight bar during said predetermined time.

16. The machine of claim 15, wherein each of said position detectors includes a plurality of photocell transmitter/receivers positioned adjacent to said path segment; and a reflective pattern on said flight bar, said pattern uniquely identifying said flight bar, and being positioned to intersect the beams of at least one of said photocell transmitter/receivers.

17. The machine of claim 14, further comprising:
    electrical heater strips mounted along at least one side of each of said flight bars such that said heater strips engage said film sheet when said flight bars press said film sheet against the walls of said container;

means for applying a non-welding idle voltage to said heater strips; and means for applying a welding voltage to said heater strips responsive to a container approaching said path segment.

18. The machine of claim 15, further comprising:

electrical heater strips mounted along at least one side of each of said flight bars such that said heater strips engage said film sheet when said flight bars press said film sheet against the walls of said container;

means for providing an idle level signal;

means responsive to said idle level signal for providing an idle voltage to said heater strips;

means responsive to a container approaching said path segment for providing a welding level signal for a selected time;

means responsive to said welding level signal for terminating said idle level signal and for providing said welding voltage to said heater strips; and means operative at the end of said selected time and in the absence of containers approaching said path segment for terminating said welding level signal and providing said idle level signal.

19. The machine of claim 18, further comprising means for applying a warm-up voltage lower than said idle voltage for a predetermined time upon initial operation of said machine.

20. A machine for packaging articles in trays, comprising:

means for moving a plurality of flight bars to dispose a continuous sheet of film over said trays and bond said film to said trays; and at least one film cutting means, comprising:
 (a) a sliding member slidably attached to said flight bar along a horizontal axis;
 (b) a cutting blade assembly slidably attached to said sliding member along a vertical axis;
 (c) a cam follower operably associated with said sliding member and said cutting blade assembly; and
 (d) means for defining a cam surface in the path of said cam followers, so as to cause said cutting blade assembly to move along said vertical axis relative to said sliding member to pierce said film, and thereafter to cause said sliding member to slide along said flight bar to sever a portion of said film.

21. A machine for urging a first and a second container along a container path, comprising;

a frame;

first transport means for urging said first container along said container path, comprising:

a first drive sprocket rotatably mounted along a first axis of rotation relative to said frame;

a first idling sprocket;

a first endless chain having a first flight bar mounted thereon, said first chain engaging said first drive sprocket and said first idling sprocket such that said first flight bar moves along an orbital path, said orbital path including a path segment extending along said container path; and means for driving said first drive sprocket such that said first flight bar passes along said first path segment and urges said first container along said container path; and second transport means for urging said second container along said container path, comprising:

a second drive sprocket rotatably mounted along said first axis of rotation relative to said frame;

a second idling sprocket;

a second endless chain having a second flight bar mounted thereon, said second chain engaging said second drive sprocket and said second idling sprocket such that said second flight bar moves along said orbital path, said orbital path including said path segment extending along said container path; and means for driving said second drive sprocket such that said second flight bar passes along said path segment and urges said second container along said container path.

22. A machine for packaging articles in trays, comprising;

means for moving a plurality of flight bars to dispose a continuous sheet of film over said trays and bond said film to said trays; and at least one film cutting means, comprising:
 (a) a sliding member slidably attached to said flight bar along a horizontal axis;
 (b) a cutting blade assembly slidably attached to said sliding member along a vertical axis;
 (c) a cam follower;
 (d) a linking member piovotally attached to said cam follower, sliding member, and said cutting blade assembly, and
 (e) means for defining a cam surface in the path of said cam followers, so as to cause said cutting blade assembly to move along said vertical axis relative to said sliding member to pierce said film, and thereafter to cause said sliding member to slide along said flight bar to sever a portion of said film.

* * * * *